United States Patent
Tidmarsh

(10) Patent No.: US 7,011,029 B2
(45) Date of Patent: Mar. 14, 2006

(54) VEHICULAR LINEAR PNEUMATIC PROPULSION SYSTEM

(75) Inventor: Thomas John Scott Tidmarsh, Farthings, No. 2, The Old Coach Road Birch Green, Hertford, Hertfordshire (GB) SG14 2LP

(73) Assignee: Thomas John Scott Tidmarsh, (GB)

( * ) Notice: Subject to any disclaimer, the term of this patent is extended or adjusted under 35 U.S.C. 154(b) by 0 days.

(21) Appl. No.: 10/469,640

(22) PCT Filed: Mar. 1, 2002

(86) PCT No.: PCT/GB02/00916

§ 371 (c)(1),
(2), (4) Date: Sep. 3, 2003

(87) PCT Pub. No.: WO02/070318

PCT Pub. Date: Sep. 12, 2002

(65) Prior Publication Data

US 2004/0079257 A1 Apr. 29, 2004

(30) Foreign Application Priority Data

Mar. 3, 2001 (GB) .................................. 0105355

(51) Int. Cl.
*B61B 13/00* (2006.01)
(52) U.S. Cl. ..................................... 104/155
(58) Field of Classification Search ............... 104/287, 104/155, 156, 161; 105/72.2
See application file for complete search history.

(56) References Cited

U.S. PATENT DOCUMENTS

| | | | |
|---|---|---|---|
| 3,722,424 A * | 3/1973 | Van Veldhuizen | 104/23.2 |
| 3,915,093 A * | 10/1975 | Barthalon et al. | 104/89 |
| 3,999,487 A * | 12/1976 | Valverde | 104/138.1 |
| 4,017,039 A * | 4/1977 | Carstens | 406/105 |
| 4,165,845 A * | 8/1979 | Carstens et al. | 406/192 |
| 4,658,732 A * | 4/1987 | Coester | 104/156 |
| 5,826,701 A * | 10/1998 | Miura | 198/619 |
| 5,845,582 A * | 12/1998 | Coester et al. | 104/156 |
| 6,029,579 A * | 2/2000 | Andre et al. | 105/72.2 |
| 6,076,469 A * | 6/2000 | Coester | 104/155 |
| 6,170,404 B1 * | 1/2001 | Robertson | 104/155 |
| 6,389,983 B1 * | 5/2002 | Coester et al. | 104/155 |

* cited by examiner

Primary Examiner—S. Joseph Morano
Assistant Examiner—Robert J. McCarry, Jr.

(57) ABSTRACT

A vehicular linear propulsion system for use along a track, comprising: a tubular drive line (3) divided lengthwise into a plurality of mutually-sealed sectors connected end-to-end by sector gate air valves (SG); at least one main supply pipe running adjacent, preferably parallel, to the drive line for the supply of air to the drive line or the evacuation of air from the drive line; at least two main air valves (V1, V2 or P1, P2) near respective ends of each sector for selective communication with the main supply pipe; and two exhaust air valves (I1, I2 or E1, E2) near respective ends of each sector for selective communication with the atmosphere for exhausting air or taking air in.

25 Claims, 5 Drawing Sheets

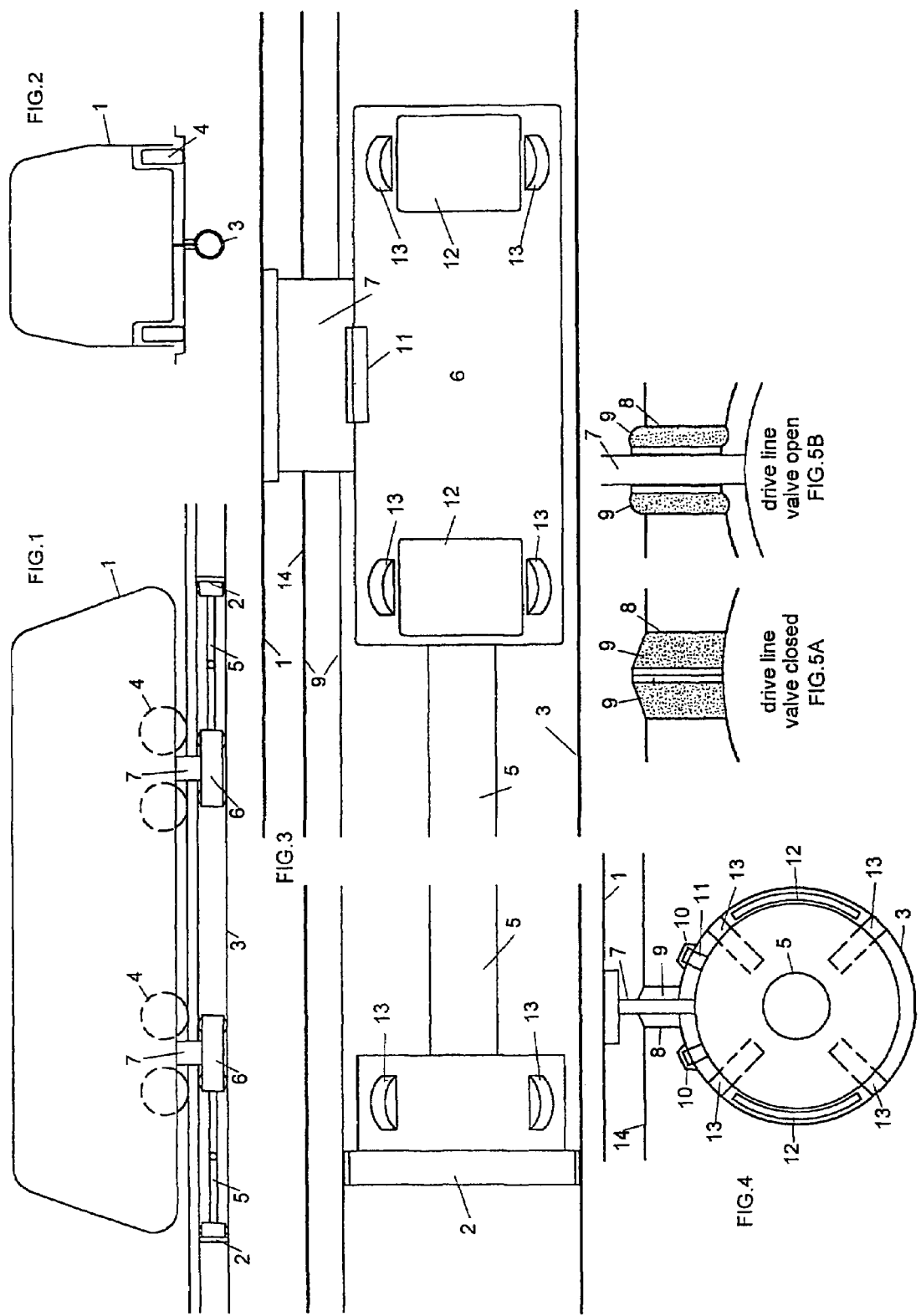

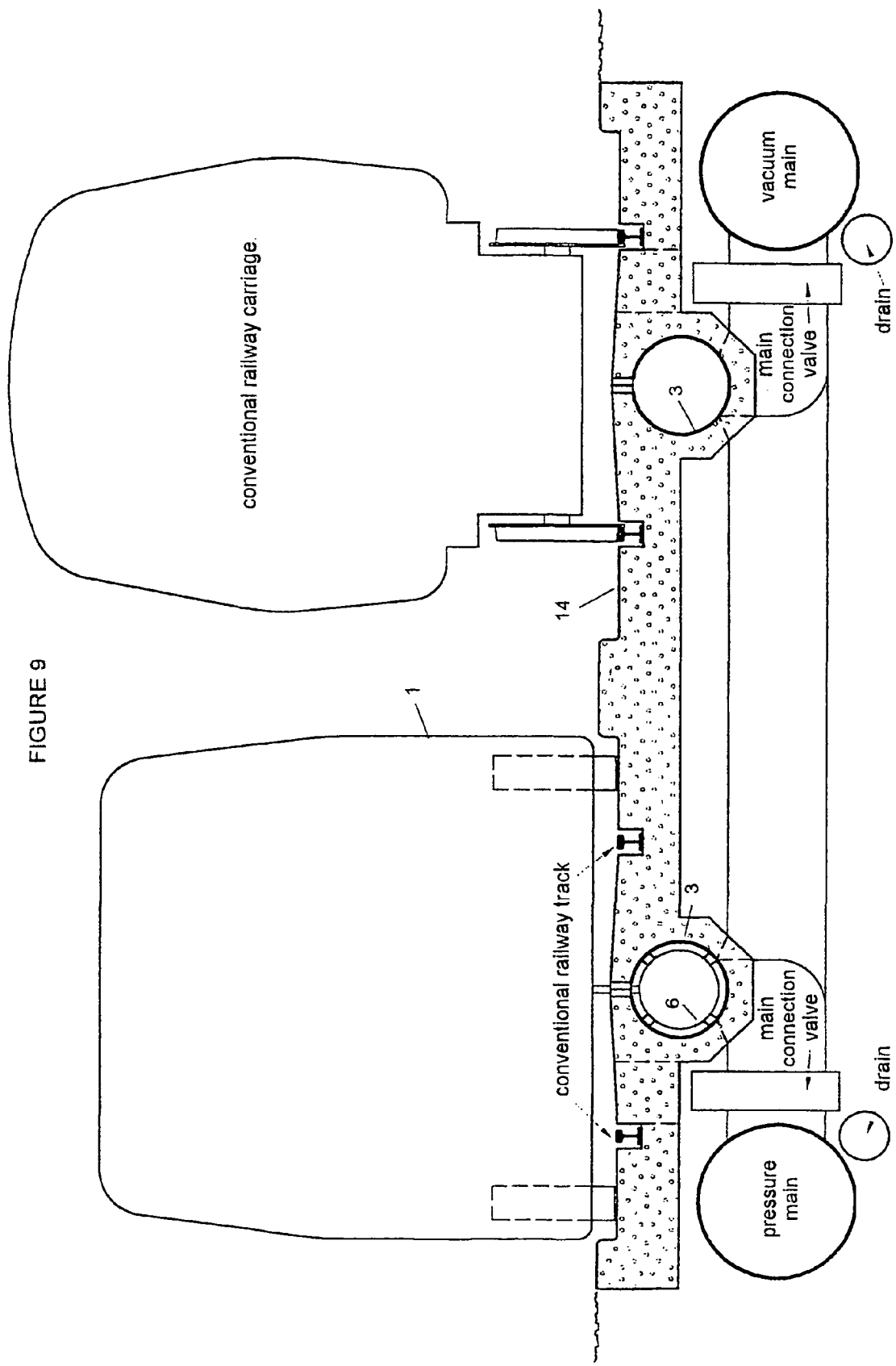

VEHICULAR LINEAR PNEUMATIC PROPULSION SYSTEM

This invention relates to a linear propulsion system for driving vehicles along a track, and may for example be used in place of railways. The invention also provides a method of propelling a vehicle along a track.

Most railways today comprise trains with iron wheels running on iron track, carrying a locomotive engine and also fuel if they are not electrically powered. These lack energy efficiency, are damaging to the environment by requiring emissions of greenhouse and ozone-damaging gases, are not entirely safe from collision and derailment, lack reliability due to breakdowns and failures of vehicles, track and signalling, and fail to give sufficient flexibility to passengers in their journeys.

The purpose of the invention is to mitigate these drawbacks by a radical change in concept. I have concluded that a rebirth, using modern technology, of the "atmospheric" or "pneumatic" propulsion railway, invented over 200 years ago, would provide a dramatic improvement and bring the benefits so urgently needed to our transport infrastructure. A carriage was drawn along by connection to a piston running in a small tube beneath the train; this required a continuous slot in the top of the tube with a flexible flap or valve to close it while allowing a connector to pass through from the piston to the carriage. A vacuum was created ahead of the piston which was driven forward under atmospheric pressure.

The principal atmospheric railways were:

The Dublin and Kingstown, in Ireland, from 1844 to 1854—2.4 km (1.5 miles) long

The London and Croydon, in England, from 1846 to 1847—8 km extended to 12 km

The Paris to St Germain, in France, from 1847 to 1860—2.2 km long

The South Devon, in England, from 1847 to 1848—24 km (15 miles) long extended to 32 km The Dublin and the Paris railways were single track, with the return journey being downhill under gravity. The two English projects worked in both directions under air pressure, but they were short-lived due to several substantial problems which inhibited their development. The dramatic progress of steam and then the arrival of electric and diesel traction meant that atmospheric railways became much less important. However, more recent attempts to use the concept have included an atmospheric railway in 1983 in Porto Alegre, Brazil as a demonstration line, and another in Djakarta, Indonesia in 1989. The propulsion is by means of a plate running in a duct below the vehicle which is pushed by low pressure air from fans located along the track. A number of cars run on a single track in a loop under computer control. During the 19th and 20th centuries there had also been some pneumatic railways in which the whole carriages were blown internally along tubes by air pressure; the most notable of these were in London and New York. However their application is so restricted and specialised that it is unlikely that internal pneumatic systems can solve the problems identified with conventional railways.

The atmospheric propulsion system is clean, safe and efficient, and the air pumping station can be configured for maximum efficiency. As the locomotive is removed from the train, huge savings in weight can be made, with a corresponding reduction in energy consumption. The reasons earlier systems failed were:

The problems with the continuous valve along the top of the atmospheric pipe, which used leather and waxy sealing compounds subject to failure through wear, fatigue and freezing The inflexibility of the amount of propulsion force—the use of a vacuum limited the pressure difference to one atmosphere (effectively to 0.9 atmosphere)

The inability to cope with junctions and track switches effectively, particularly between successive pumping stations The need to communicate with the pumping station to ensure power was available for the train when it entered the system These outweighed the disadvantages of energy consumption and so on, and good steam coal was cheap and plentiful.

The present invention solves these earlier problems and meets the challenges today of energy consumption, safety, reliability and pollution, by combining modem technology of materials and operating systems with a radically new basic propulsion system.

The invention provides a vehicular linear propulsion system for use along a track, comprising: a tubular drive line divided lengthwise into a plurality of mutually-sealed sectors connected end-to-end by sector gate air valves; at least one main supply pipe running adjacent to the drive line for the supply of air to the drive line or the evacuation of air from the drive line; at least two main air valves near respective ends of each sector for selective communication with the main supply pipe; and two exhaust air valves near respective ends of each sector for selective communication with the atmosphere for exhausting air or taking air in.

The invention also provides a method of propelling a vehicle along a track along which there is a tubular drive line divided lengthwise into a plurality of mutually-sealed sectors, in which the vehicle is drivingly connected to a piston running in the drive line, comprising supplying a vacuum and/or pressurised air from an adjacent main or from two adjacent mains selectively to the appropriate end region or regions of the currently-used sector to provide a pressure difference across the piston, and driving the piston from sector to sector by exhausting the next adjacent sector to the atmosphere and then temporarily allowing air to flow and the piston to pass between the current sector and that next adjacent sector, and then supplying the vacuum and/or the pressurised air to that adjacent sector which has become the current sector and repeating the cycle.

The track is preferably divided into sections, each with its own main(s), the sections optionally linked by track diversion means (the equivalent of points on conventional railway track) or else coupled directly, each section optionally having a plurality of sectors as defined above. This arrangement allows vehicles to be driven continuously from section to section, for the first time in any atmospheric propulsion system, and even to allow route diversion without interruption of drive.

Accordingly, the invention also provides a method of propelling a vehicle along a track comprising a plurality of mutually-sealed sections which are joined lengthwise and each of which has a tubular drive line, in which the vehicle is drivingly connected to a piston capable of running in each drive line and of crossing between the drive lines of adjacent sections for continuous drive, comprising supplying a vacuum and/or pressurised air from one or more respective main selectively to the appropriate end region or regions of the currently-used section to provide a pressure difference across the piston, each section having its own independent main supply, and driving the piston from section to section by exhausting the next adjacent section to the atmosphere and then temporarily allowing air to flow and the piston to pass between the current section and that next adjacent section, and then supplying the vacuum and/or the pressurised air to that adjacent section which has become the current section and repeating the cycle.

Correspondingly, the invention provides a vehicular linear propulsion system for use along a track, comprising: a tubular drive line divided lengthwise into a plurality of mutually-sealed sections connected end-to-end by section gate air valves; and for each section at least one main supply pipe for the supply of air to the drive line and/or the evacuation of air from the drive line; at least two main air valves near respective ends of each section for selective communication with the main supply pipe; and two exhaust air valves near respective ends of each section for selective communication with the atmosphere for exhausting air or taking air in; whereby a vehicle may be driven by coupling it to a piston running continuously along the drive line from section to section.

In order that the invention may be better understood, three embodiments will now be described, by way of example only, with reference to the accompanying diagrammatic drawings, which are not drawn to scale, in which:

FIG. 1 is a vertical centre section through a vehicle and a drive line embodying the invention;

FIG. 2 is a transverse section through the vehicle and drive line of FIG. 1;

FIG. 3 is a vertical centre section, drawn to an enlarged scale, of part of the arrangement of FIG. 1, in which the drive line is partly broken away so as to accommodate the relevant parts in the figure to a common scale;

FIG. 4 is an enlarged transverse section through part of the arrangement of FIG. 2;

FIG. 5A is a greatly enlarged transverse section through the drive line valve of FIG. 4, with the valve closed;

FIG. 5B is a view corresponding to FIG. 5A but with the valve open;

FIG. 9 is a section through a duplex twin track railway embodying the invention.

THE DRIVE SYSTEM

Figure 6:
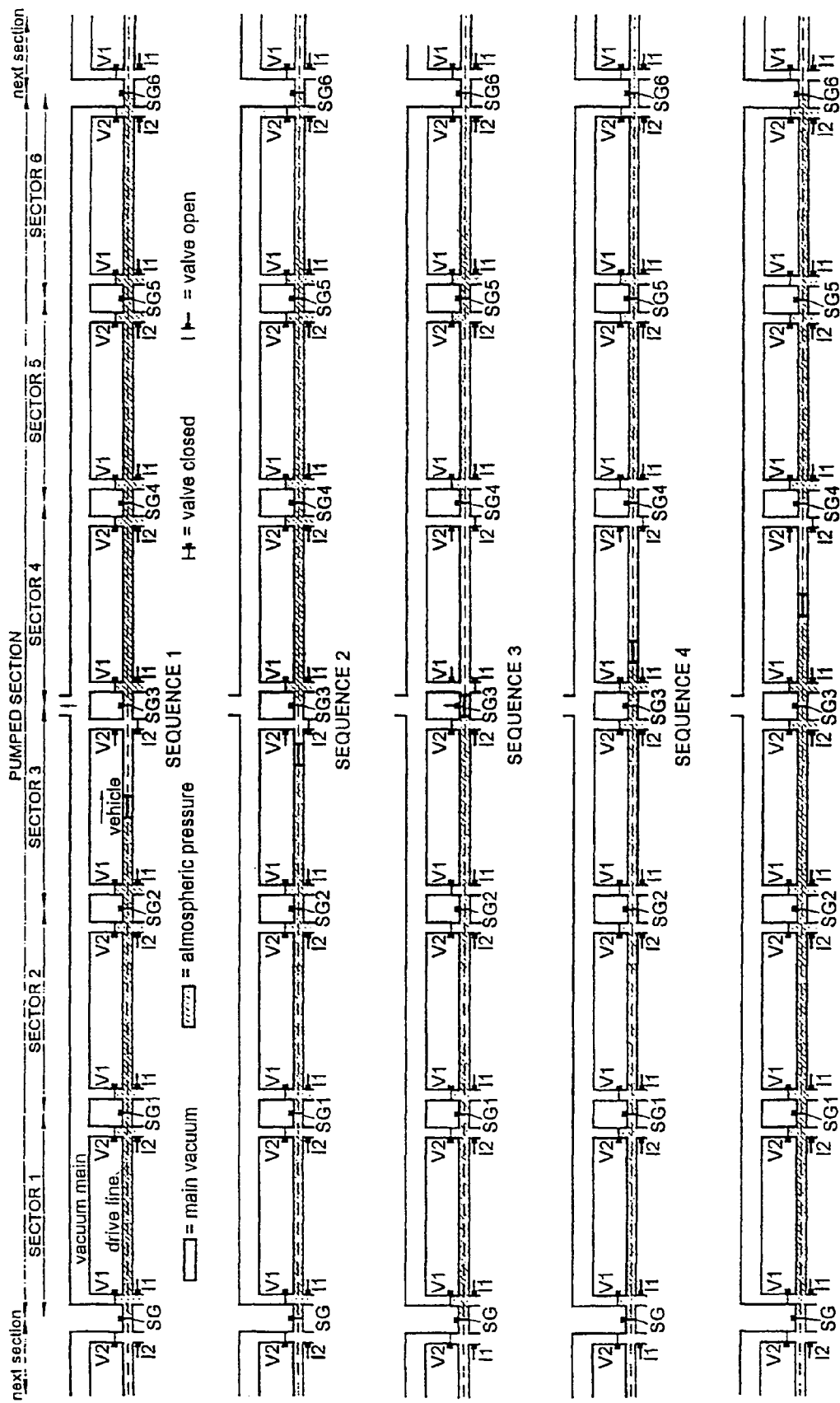
FIG. 6 shows a sequence of five stages of operation of the valves in the drive line of a mono vacuum system embodying the invention.

With reference to FIGS. 1 to 5, a passenger or freight vehicle 1 is propelled by air pressure acting on a piston or pistons 2 running in a tube 3 below the vehicle known as the Drive Line. The piston has a pressure tight seal to the drive line tube and has wheels 4 to support its weight. As a further feature, the piston has a diaphragm valve (not shown) which can be opened to relieve the air pressure in the event of emergency braking conditions.

The piston is connected by means of an articulated connecting rod 5 to a wheeled carriage or trolley running in the drive line known as the line truck 6. The truck wheels 13 are aligned radially of the tube 3 Rising vertically from the line truck is a flat pylon 7 which passes through a continuous slot 8 in the top of the drive line and which is coupled to the underside of the wheeled vehicle which runs above, thus transmitting the thrust of the piston to that vehicle.

In order to maintain the pressurised condition of the drive line the slot along the top is closed by a continuous seal 9 known as the drive line valve. This valve is resilient and configured in such a way as to allow the pylon 7 from the line truck to pass through it but to close when the pylon moves away. There are a number of methods of constructing the drive line valve, but one of the most promising is the use of a pair of resilient, closed cell polymer foam strips with flexible wear strips bonded to the adjoining faces. Four important requirements of the drive line valve are that it should seal the slot as tightly as possible, that it should permit the pylon to pass through easily, that it should preserve the circular profile of the drive line and that it should shed water which might otherwise freeze in the valve.

The propulsive force can be applied to the piston in three different modes. In mode 1, shown in FIG. 6, known as mono vacuum, the drive line ahead of the piston is evacuated and that behind it is open to the air thus allowing atmospheric pressure to provide the driving force. Mode 2, shown in FIG. 7, known as mono pressure, applies pressure behind the piston and allows the drive line ahead of it to vent to the outside. Mode 3, shown in FIG. 8, known as duplex, combines the two preceding modes by applying both vacuum and pressure to the different sides of the piston. To accommodate these modes it is important that the drive line valve 9 be capable of sealing both inward and outward from the drive line.

The driving force developed by the system depends upon a number of factors:

The drive mode adopted

The level of vacuum developed

The pressure applied

The surface area of the piston

The efficiency of the piston seal

In mode 1 (vacuum only) the force is limited by the best vacuum that can be achieved and this is unlikely to be better than 0.9 atmosphere. The limits on the pressure that can be applied are the power of the main pump and the capacity of the drive line valve to maintain an airtight seal—it is likely that pressures of one to one and a half atmospheres (approx 1 to 1.5 bar) would be practical. The force acting on the piston in kiloNewtons can be calculated by the following formula:

$$\text{Force} = \pi(D/2)^2 * P/100$$

where D=diameter of the piston in cm and P=differential pressure on the piston in bar. Thus, for a 50 cm diameter piston with an applied vacuum of −0.9 bar and pressure of 1.5 bar, the resultant force would be 47.12 kN or 4.8 tonnes. As a comparison, the original specification Rolls Royce Olympus jet engine used to power Concorde produced a thrust of 102 kN.

Power Distribution

Figure 7:
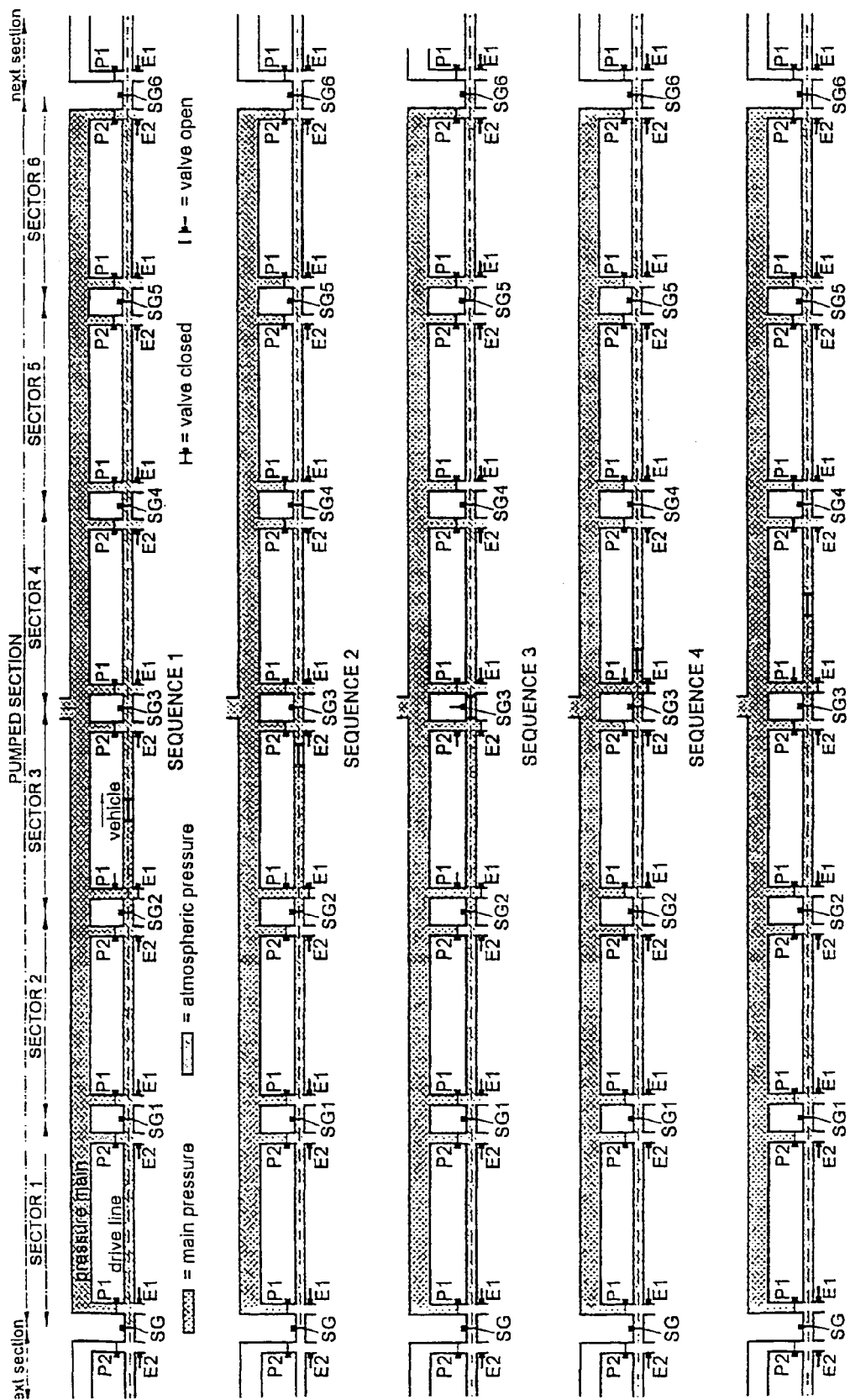
FIG. 7 shows a sequence of five stages of operation of the valves in the drive line of a mono pressure system embodying the invention.
Figure 8:
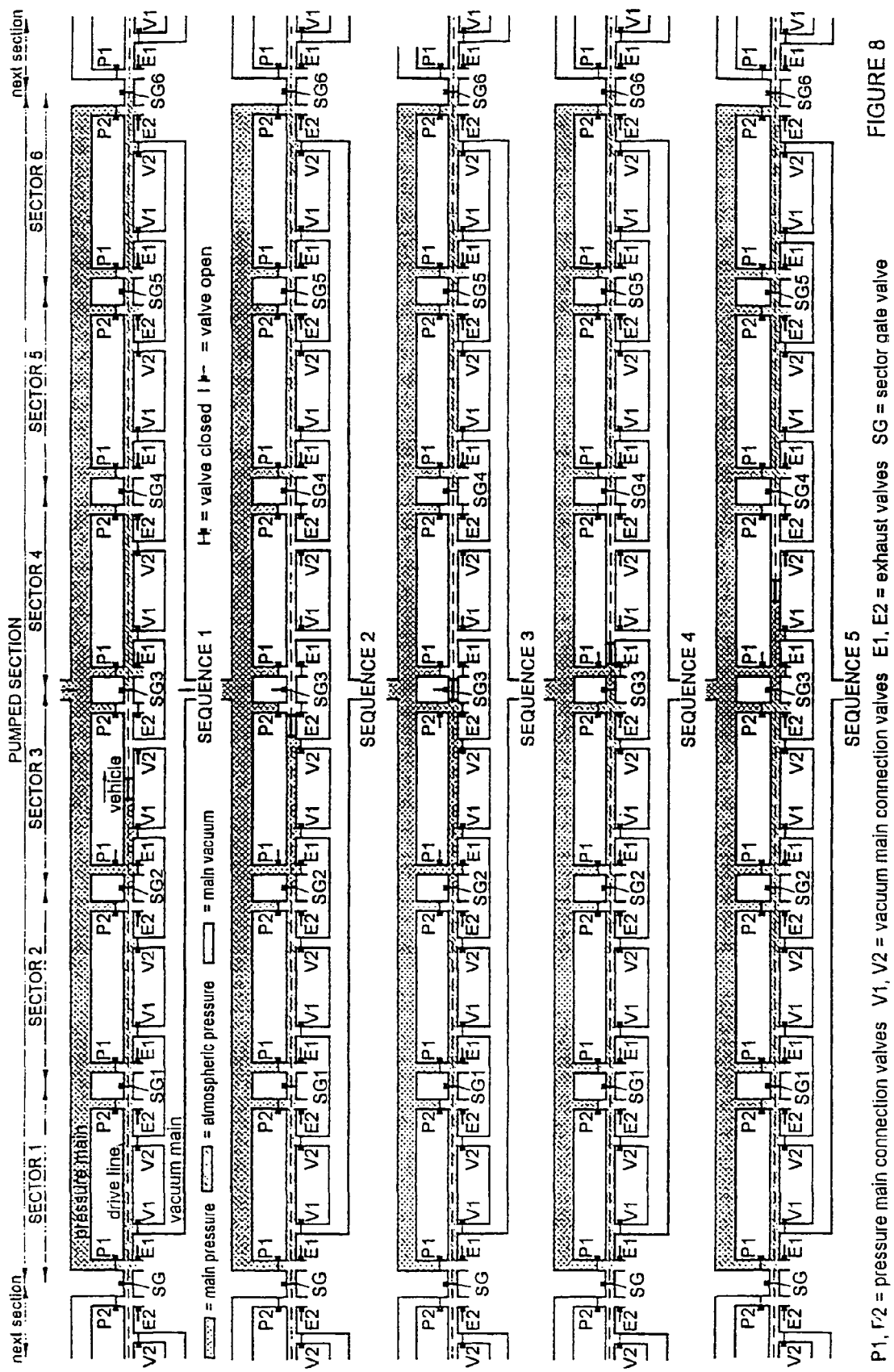
FIG. 8 shows a sequence of five stages of operation of the valves in the drive line of a duplex vacuum and pressure system embodying the invention.

The vehicle drive line 3 is divided lengthwise into contiguous sections, each of which is divided lengthwise into sectors, as shown in each of FIGS. 6 to 8 Each section is serviced by a static main pumping station (not shown) which delivers pressurised air and/or a vacuum to the drive line as required by the drive mode. The position of the pump in relation to the drive line section that it services is relatively flexible but, to optimise operational efficiency, it should be close to the centre of the section.

The pressure/vacuum is delivered to the drive line by means of pipes which run parallel to it along its whole length and these are known as the parallel mains. One is a vacuum main and the other a pressure main. The pumps operate on a demand basis, that is to say, the pressure and vacuum levels in the parallel mains are monitored and the pumps only run when these levels require to be topped up. By this method energy input is only required when any part of a section is active and there is no requirement for a vehicle specifically to activate the pumps.

Although in this example the mains pipes run parallel to the drive line, there could be alternative arrangements for linking the pumping stations to the drive line by pipes which cross land between different drivelines, in any practical layout, or for mains with more complex, non-parallel layouts adjacent the driveline.

Within the length of one section the drive line is continuous but divided into a number of short sectors by means of sector gates which can be opened or closed by sector gate valves SG, SG1 to SG6 The vacuum and/or pressure is fed to both ends of each sector by connections to the parallel main(s) which are closed off by valves (the main connection valves). In the mono vacuum system of FIG. 6, the vacuum main connection valves V1 and V2 are situated close to the respective ends of each sector, as are the intake valves I1 and I2 respectively which are for air intake from the atmosphere. In the mono pressure system of FIG. 7, the main pressure connection valves P1 and P2 are situated close to the respective ends of each sector, as are exhaust valves E1 and E2 respectively which are for exhausting air into the atmosphere. In the duplex system of FIG. 8, in addition to the main pressure valves P1, P2 and exhaust valves E1, E2, there are main vacuum valves V1, V2 close to respective ends of the sectors, but slightly further from the ends than the pressure valves for the reason given below.

By means of sequential opening and closing of the main connection valves and the intake and exhaust valves the vacuum and/or pressure mains can be connected to the drive line in such a way as to impart thrust to the piston and thence to the coupled vehicle. When the vehicle reaches the sector gate valve SG or SG1 to SG6 this is opened at the same time as the relevant valves in the next sector are opened or closed to provide a continuity of drive. This same procedure is repeated when the end of the pumped section of drive line is reached, thus enabling the vehicle to be passed to the next section. The sections are typically joined contiguously and their drive lines linked by section gate valves similar to the sector gate valves, so that drive passes smoothly from the last sector of one section to the first sector of the next section, using the same valve sequencing as for within a section. However, in order to allow vehicles to be diverted between different sections for different routes, a diverting means (not shown) is used to couple longitudinally-adjacent sections of track, by analogy with conventional 'points' on railways. A section may lie adjacent to two or more other sections, to allow a vehicle to pass to a selected one of those other sections, by controlling the transverse position of the diverting means. The diverting means is a form of 'manifold' with a plurality of tubes at each end, the tubes being close to each other at one end but divergent at the other end, and with internal drive lines linking respective tubes such that they 'fan out'. The diverting means slides transversely so as to link the appropriate internal drive line with the single section at one end and with the selected section at the other end. This movement is done before the vehicle enters the relevant sections.

By way of illustration with reference to the duplex mode of FIG. 8, as the vehicle approaches the junction between two sectors the exhaust valves are closed and the vacuum main valves are opened in the next sector and then the sector gate valve is opened to allow continuous drive. When the vehicle has passed through the sector gate valve it is closed as are the main connection valves in the previous sector. The exhaust valves are then opened to return the sector to the inactive condition. The valves on adjoining sectors are interlocked so that they can only be operated in a specific configuration. The purpose of this is to make it impossible for a vehicle to enter a sector if that sector is already active, i.e. there is another vehicle running in it. This makes the system inherently safe with natural vehicle separation thus preventing the possibility of collision occurring. The safety system works by interlocking the valves in such a way that the "through" sequence can only proceed if the exhaust valves on the next sector are open—if they are not, the sector gate valve remains closed and the drive condition in the current sector is reversed to stop the vehicle.

The pressure main connection valves P1, P2 and the exhaust valves E1, E2 are located near both ends of each sector close to or immediately adjacent the sector gate valve SGn, but the vacuum main connection valves V1, V2 are some distance into the sector. The purpose of this is to provide a safety zone to allow a braking distance in the event of the anti-collision system described above coming into operation. The length of the safety zone would be variable dependent upon the maximum speed of traffic using the track.

The mono systems work in a similar way to the duplex system, as explained in more detail below.

The mains and the drive line would need to be equipped with a drainage facility to remove any water that might collect from condensation or penetration of the drive line valve. The drainage connections to the drive line would only be open when the line is in the inactive exhausted state whilst the main drainage connections would be opened by the level of the water requiring to be expelled in order to preserve the vacuum/pressure conditions in the mains. Both systems would need to be non-return to prevent any ingress of external water into the system.

To provide auxiliary power to a vehicle for heating, lighting etc. the drive line may have internal low voltage electric rails 10 with sliding pickup contacts 11 on the line truck connecting to the vehicle through the coupling. Stand-by batteries on the vehicle support these utilities in the event of system failure.

Braking and Speed Control

The braking system for the vehicle is accomplished at three levels:
Drive line air pressure braking
Line truck to drive line mechanical braking
Vehicle suspension wheel braking The first of these levels, drive line pressure braking, is the principal system and the normal operation and emergency braking. It works by reversing the sequence of the opening and closing of the main connection valves. This has the effect of applying pressure ahead of the piston and a vacuum behind it (in duplex mode) thus bringing it to a halt, at which time the main connection valves would be closed and the exhaust valves opened. This configuration allows the kinetic energy of the train to be returned to the system where it can be stored for later use (regenerative braking).

The line truck mechanical braking consists of brake pads 12 which bear on the inside of the drive line tube 3, to provide mechanical friction braking. In normal braking operations this would only be applied when the vehicle has been brought nearly to a standstill by drive line pressure braking and serves to hold the vehicle in the stationary position. It can, however, be used in emergency braking as an addition to the pressure braking or as an alternative in the event of a system failure.

The vehicle suspension wheel braking is a backup system which would rarely be used. Its function is to prevent "run-away" of the car (or other vehicle) 1 when it is uncoupled from the line truck 6 It is achieved by conventional braking applied to the suspension wheels 4.

To cater for the eventuality of an emergency braking requirement coinciding with a control system failure which results in the drive line remaining active, and as already mentioned, the piston incorporates a diaphragm valve which can be opened to release the driving force from the vehicle.

Control of the vehicle speed is by regulating the degree by which the main connection valves are opened, effectively turning them into throttles. In the event of a control system failure, over-ride emergency speed control can be achieved by use of the piston diaphragm valve described in the previous paragraph. When it is required to make a substantial speed reduction or when the train is on a steep downward gradient this would be done by reversal of the drive line as is done for braking. This has the advantage of being regenerative.

If a section of track has substantial upward gradients then the power of the main pumps would need to be increased in order to maintain speed levels. Again, the vehicles on these gradients travelling in the downward direction would be able to run regeneratively to return energy to the system.

Control System

For normal running, speed regulation and braking it is necessary to be able to operate the main connection and exhaust valves remotely from the control location which can either be a central control or a control on board the vehicle. Communication with valve operators, i.e. electrically-driven, pneumatic or hydraulic valve actuators (not shown), which operate the valves, is electronic, either by radio or, preferably, by signals transmitted as modulated electronic signals through the auxiliary power rails 10 in the drive line. To enable operation in the event of control system failure, there is preferably also a mechanical over-ride device working from the vehicle, through hydraulic connections or other means.

The Pumps and Power Sources

It is one of the principal features of the system that it is able to use virtually any energy source to drive the pumps. The only specified requirement of the pumps is that they should have the capacity to produce vacuum or pressure at sufficient levels and volumes to maintain the required operating speeds. As previously described the likely vacuum minimum would be –0.9 bar and the pressure 1.5 bar. To get some measure of the volumes needed at these pressures the instance of a drive line having a diameter of 50 cm driving a vehicle at 100 kilometres per hour would need in the order of 330 cubic metres of air per minute. For this order of capacity it is likely that the pumps would need to be of the large section, high speed turbine type.

The energy input can, as has previously been mentioned, take any available form. As well as using electricity generated by conventional or alternative fuels, power units could be gas turbines, wind, wave, water, geothermal or tidal power. In the case of the latter, the power input would be by direct connection to the pump in order to remove the losses associated with electricity generation thus improving the energy efficiency of the system.

The Track

A track 14 for supporting the vehicle is shown schematically in the drawings. With the drive line running along the centre of the track providing the drive, guidance and braking, the function of the track 14 is solely to form a smooth continuous surface upon which the wheels 4 of the vehicle run. One suitable configuration is a roadway construction of concrete with a smooth surface finish. To allow thermal movement there need to be expansion joints at intervals, but it contributes significantly to the smooth running of the system if these are constructed to avoid any surface discontinuity—e.g. with the use of a "comb" joint or some other such device.

As the track presents what is virtually a conventional road surface it can be used to run road vehicles for maintenance or breakdown recovery. Since the wheels of the vehicle do not drive, steer or brake it, the presence of water on the track is no problem. However, as the noise caused by standing water being thrown up as spray would be disconcerting on passenger vehicles, it is best if the track is slightly cambered to shed water. When applied to a curved section, the track is laid with a cant to counteract the centrifugal force on the vehicle. In order to protect the drive line valve from excessive loads it is preferable to have a form of lateral guidance rail on curves when vehicles are travelling faster or slower than the optimum speed for the degree of cant. Although not needed in normal operation, it is advisable for the edge of the track to have some form of raised kerb. This provides some means of retaining a vehicle on the track in the event of its becoming uncoupled from the drive line One or more of the parallel mains is or are laid adjacent to the track but there is considerable flexibility in its or their positioning. Where tracks are laid in multiples of two or more a number can be served by one parallel main system provided that the main has sufficient volumetric capacity.

As shown in FIG. 9, one variation of the track configuration is the incorporation in it of a standard gauge conventional railway track. This enables the use of current rail rolling stock and even locomotives on the track 14. A vehicle with pneumatic tyres is shown on the left-hand track, using a broader gauge flat track portion, and a conventional railway carriage is shown on the right-hand track, running on conventional rails at standard narrower gauge within the flat track portion. In this example there are two parallel drive lines, but there may be just one, or more than two, using the same mains.

Another variation is to invert the system, such that the vehicle is suspended from an overhead track. The track is then inverted.

Vehicle Construction and Suspension

Since the vehicles 1 do not have to span between widely separated wheeled bogies as conventional railway rolling stock does, they do not require strong rigid chassis. Neither do passenger vehicles 1 need to be strongly constructed to stand up to the effects of derailment or collision. As a consequence, the construction can be lightweight and supported by wheels 4 placed along its length.

The wheels have high pressure pneumatic tyres which do not require to have a tread pattern since track adhesion is not a requirement. The tyres can be smooth for quiet running on the track surface and can be made from a material selected for maximum durability and strength.

The suspension of the wheels only needs to have minimum travel to accommodate changes in gradient because the track has a very even surface. To optimise the running condition of the wheels on curved tracks, some are able to turn to some degree to remain parallel to the drive line by means of a mechanical linkage to the line truck coupling.

3. Duplex System—Here the drive line is served by two parallel mains, one pressurised and one evacuated, connected to the drive line by valves as before. This is the most versatile system for use where intensive and high speed operation are required. The system is able to deliver the highest drive and braking forces but, as the pressure and vacuum are applied separately, the pressure that the drive line valve has to resist is significantly reduced.

Valve Sequence for Mono Vacuum Drive (FIG. 6)

Normal Running

Starting Conditions:

Main evacuated to working level

All non-active sector main connection valves closed and intake valves open

All sector gate valves closed

Sector 3 active with vehicle at mid point travelling towards sector 4

|  | S2 | SECTOR 3 | | | | | SECTOR 4 | | | | |
| --- | --- | --- | --- | --- | --- | --- | --- | --- | --- | --- | --- |
|  | SG2 | V1 | I1 | I2 | V2 | SG3 | V1 | I1 | I2 | V2 | SG4 |
| SEQUENCE 1 | close | close | open | close | open | close | close | open | open | close | close |
| SEQUENCE 2* | close | close | open | close | open | close | close | open | open | close | close |
| SEQUENCE 3 | close | close | open | open | close | open | open | close | close | open | close |
| SEQUENCE 4 | close | close | open | open | close | close | close | open | close | open | close |
| SEQUENCE 5 | close | close | open | open | close | close | close | open | close | open | close |

Drive Modes and Valve Sequencing

As previously described, the drive system is available in three modes and these are described in detail in the following text. This description is supported by FIGS. 6 to 8 together with the related valve conditions in table format.

This sequence then repeats for sectors 4 and 5 and so on

*Note: Sequence 2 above is conditional upon valves I1 and I2 in sector 4 both being in the OPEN state. If either I1/4 or I2/4 is CLOSED this indicates that the sector is already active with a vehicle in it. In this event the following alternative sequence occurs:

|  | S2 | SECTOR 3 | | | | | SECTOR 4 | | | | |
| --- | --- | --- | --- | --- | --- | --- | --- | --- | --- | --- | --- |
|  | SG2 | V1 | I1 | I2 | V2 | SG3 | V1 | I1 | I2 | V2 | SG4 |
| SEQUENCE 2 (ALT) | close | open | close | open | close | close | ? | close | close | ? | ? |

1. Mono Vacuum System—In this the drive line is serviced by a single parallel main which is evacuated by the main pump. The propulsive (and braking) force is produced in the drive line by opening the vacuum main valves ahead of the piston and the intake valves behind it (in this system only the latter are referred to as "intake" valves, elsewhere they are termed "exhaust" valves). The power of this system is limited by the degree of vacuum that the pump pan generate which can never be greater than one atmosphere. For this reason the system is somewhat restricted.
2. Mono Pressure System—The configuration of the parallel main, drive line and valves is identical to the Mono Vacuum system above, the difference being in the pump which delivers positive pressure and the sequencing of the valves. The available drive force in this system is limited only by the power of the main pump and the ability of the valves, particularly the drive line valve, to resist the pressure. This is the preferred option where the lower cost of the single parallel main is combined with the ability to deliver increased driving force.

When the vehicle has come to a halt the line truck brake is applied, V1/3 is closed and the piston relief valves are opened. This condition is maintained until such time as both I1/4 and I2/4 return to the open state, at which time the piston relief valves are closed and the original drive sequence is resumed. The purpose of this safety interlock is to provide AUTOMATIC VEHICLE SEPARATION by ensuring that it is impossible for a vehicle to enter a sector if that sector is already active.

Drive Line Air Pressure Braking

To bring a vehicle to a halt, hold it in the stationary position and then restart the drive line pressures are reversed. As an example of this, consider a vehicle at the end of the running sequence above, i.e. at the mid point of sector 4 moving towards sector 5—the valve sequence would be as follows:

|  | S3 | SECTOR 4 | | | | | SECTOR 5 | | | | |
| --- | --- | --- | --- | --- | --- | --- | --- | --- | --- | --- | --- |
|  | SG3 | V1 | I1 | I2 | V2 | SG4 | V1 | I1 | I2 | V2 | SG5 |
| SEQUENCE 5 | close | close | open | close | open | close | close | open | open | close | close |
| Braking Sequence | close | open | close | open | close | close | close | open | open | close | close |
| Stationary-line truck brake on | close | close | close | close | close | close | close | open | open | close | close |
| Restart-return to normal running | close | close | open | close | open | close | close | open | open | close | close |

Valve Sequence for Mono Pressure Drive (FIG. 7)

Normal Running

Starting Conditions:

Main pressurised to working level

All non-active sector main connection valves closed and exhaust valves open

All sector gate valves closed

Sector 3 active with vehicle at mid point travelling towards sector 4

E1/4 and E2/4 return to the open state, at which time the piston relief valves are closed and the original drive sequence is resumed. The purpose of this safety interlock is to provide AUTOMATIC VEHICLE SEPARATION by ensuring that it is impossible for a vehicle to enter a sector if that sector is already active.

Drive Line Air Pressure Braking

To bring a vehicle to a halt, hold it in the stationary position and then restart the drive line pressures are

|  | S2 | SECTOR 3 | | | | | SECTOR 4 | | | | |
| --- | --- | --- | --- | --- | --- | --- | --- | --- | --- | --- | --- |
|  | SG2 | P1 | E1 | E2 | P2 | SG3 | P1 | E1 | E2 | P2 | SG4 |
| SEQUENCE 1 | close | open | close | open | close | close | close | open | open | close | close |
| SEQUENCE 2* | close | open | close | open | close | close | close | open | open | close | close |
| SEQUENCE 3 | close | open | close | close | open | open | close | open | open | close | close |
| SEQUENCE 4 | close | close | open | open | close | close | open | close | open | close | close |
| SEQUENCE 5 | close | close | open | open | close | close | open | close | open | close | close |

This sequence then repeats for sectors 4 and 5 and so on

*Note: Sequence 2 above is conditional upon valves E1 and E2 in sector 4 both being in the OPEN state. If either E1/4 or E2/4 is CLOSED this indicates that the sector is already active with a vehicle in it. In this event the following alternative sequence occurs:

reversed. As an example of this, consider a vehicle at the end of the running sequence above, i.e. at the mid point of sector 4 moving towards sector 5—the valve sequence would be as follows:

|  | S2 | SECTOR 3 | | | | | SECTOR 4 | | | | |
| --- | --- | --- | --- | --- | --- | --- | --- | --- | --- | --- | --- |
|  | SG2 | P1 | E1 | E2 | P2 | SG3 | P1 | E1 | E2 | P2 | SG4 |
| SEQUENCE 2 (ALT) | close | close | open | close | open | close | ? | close | close | ? | ? |

When the vehicle has come to a halt the line truck brake is applied, P2/3 is closed and the piston relief valves are opened. This condition is maintained until such time as both

|  | S3 | SECTOR 4 | | | | | SECTOR 5 | | | | |
| --- | --- | --- | --- | --- | --- | --- | --- | --- | --- | --- | --- |
|  | SG3 | P1 | E1 | E2 | P2 | SG4 | P1 | E1 | E2 | P2 | SG5 |
| SEQUENCE 5 | close | open | close | open | close | close | close | open | open | close | close |
| Braking Sequence | close | close | open | close | open | close | close | open | open | close | close |

-continued

|  | S3 | SECTOR 4 | | | | | SECTOR 5 | | | | |
|---|---|---|---|---|---|---|---|---|---|---|---|
|  | SG3 | P1 | E1 | E2 | P2 | SG4 | P1 | E1 | E2 | P2 | SG5 |
| Stationary-line truck brake on | close | close | close | close | close | close | close | open | open | close | close |
| Restart-return to normal running | close | open | close | open | close | close | close | open | open | close | close |

Valve Sequence for Duplex Drive (FIG. 8)

Normal Running

Starting Conditions:
Both mains pressurised and evacuated to working levels
All non-active sector main connection valves closed and exhaust valves open
Sector 3 is active with a vehicle at mid-point travelling towards sector 4
All sector gate valves closed sequence is resumed. The purpose of this safety interlock is to provide AUTOMATIC VEHICLE SEPARATION by ensuring that it is impossible for a vehicle to enter a sector if that sector is already active.

Drive Line Air Pressure Braking

To bring a vehicle to a halt, hold it in the stationary position and then restart the drive line pressures are reversed. As an example of this, consider a vehicle at the end

|  | S2 | SECTOR 3 | | | | | | SECTOR 4 | | | | | | |
|---|---|---|---|---|---|---|---|---|---|---|---|---|---|---|
|  | SG2 | P1 | E1 | V1 | V2 | E2 | P2 | SG3 | P1 | E1 | V1 | V2 | E2 | P2 | SG4 |
| Sequence 1 | close | open | close | close | open | close | close | close | close | open | close | close | open | close | close |
| Sequence 2* | close | open | close | close | close | close | close | open | close | close | open | open | close | close | close |
| Sequence 3 | close | open | close | close | close | close | open | open | close | close | open | open | close | close | close |
| Sequence 4 | close | close | open | close | close | open | close | close | open | close | open | open | close | close | close |
| Sequence 5 | close | close | open | close | close | open | close | close | open | close | close | open | close | close | close |

This sequence then repeats for sectors 4 and 5 and so on

*Note: Sequence 2 above is conditional upon valve E1 and E2 in sector 4 both being in the OPEN state. If E1/4 is CLOSED this indicates that the sector is already active with a vehicle in it. In this event the following alternative sequence occurs:

of the running sequence above, i.e. at the mid point of sector 4 moving towards sector 5—the valve sequence would be as follows:

|  | S2 | SECTOR 3 | | | | | | SECTOR 4 | | | | | | |
|---|---|---|---|---|---|---|---|---|---|---|---|---|---|---|
|  | SG2 | P1 | E1 | V1 | V2 | E2 | P2 | SG3 | P1 | E1 | V1 | V2 | E2 | P2 | SG4 |
| Sequence 2 (alt) | close | close | close | open | close | close | open | close | ? | close | ? | ? | ? | ? | ? |

When the vehicle has come to a halt the line truck brake is applied, V1/3 and P2/3 are closed and the piston relief valves opened. This condition is maintained until such time as E1/4 and E2/4 returns to the open state, at which time the piston relief valves are closed and the original drive

|  | SECT 3 | | SECTOR 4 | | | | | | | SECTOR 5 | | | |
|---|---|---|---|---|---|---|---|---|---|---|---|---|---|
|  | P2 | SG3 | P1 | E1 | V1 | V2 | E2 | P2 | SG4 | P1 | E1 | V1 | V2 |
| Sequence 5 | close | close | open | close | close | open | close | close | close | close | open | close | close |
| Braking Sequence | close | close | close | close | open | close | close | open | close | close | open | close | close |
| Stationary (line truck brake on)* | close | close | close | close | close | close | close | close | close | close | open | close | close |

-continued

|  | SECT 3 | | SECTOR 4 | | | | | SECTOR 5 | | | | |
| --- | --- | --- | --- | --- | --- | --- | --- | --- | --- | --- | --- | --- |
|  | P2 | SG3 | P1 | E1 | V1 | V2 | E2 | P2 | SG4 | P1 | E1 | V1 | V2 |
| Restart-return to normal running | close | close | open | close | close | open | close | close | close | close | open | close | close |

During the stationary sequence the piston relief valves are opened to remove the drive force, then closed again when the restart sequence commences.

As a possible future alternative to a direct mechanical coupling between vehicle and drive line piston, a remote coupling, using for example permanent magnets or electromagnets, may be sufficiently strong to drive the vehicle; this would avoid the need for the continuous slot 8 and valve.

The invention claimed is:

1. A vehicular linear propulsion system for use along a track, comprising:
   a tubular drive line divided lengthwise into a plurality of mutually-sealed sectors connected end-to-end by sector gate air valves;
   at least one main supply pipe running adjacent to the drive line for the supply of air to the drive line or the evacuation of air from the drive line;
   at least two main air valves near respective ends of each sector for selective communication with the main supply pipe;
   two exhaust air valves near respective ends of each sector for selective communication with the atmosphere for exhausting air or taking air in;
   a piston slideable sealingly along the drive line for driving a vehicle along the track; and
   a pylon connected to the piston and extending, in use, through an elongate slot in the wall of the drive line, the slot being sealed flexibly to allow the passage of the pylon, the pylon drivingly engaging the vehicle that is outside of the drive line.

2. A vehicular linear propulsion system according to claim 1, in which the main supply pipe is a vacuum main for connection, in sue, to an air extraction pump, and the two exhaust air valves are for taking air in.

3. A vehicular linear propulsion system according to claim 1, in which the main supply pipe is a pressure main for connection, in use, to a source of air under pressure, and the two exhaust air valves are for exhausting air.

4. A vehicular liner propulsion system according to claim 1, in which there are two such parallel main supply pipes, one being a vacuum main for connection, in use, to an air extraction pump, and the other being a pressure main for connection, in use, to a source of air under pressure.

5. A vehicular linear propulsion system according to claim 4, in which there are two air valves near each end of each sector for communicating respectively with the vacuum main and the pressure main.

6. A vehicular linear propulsion system according to claim 1, comprising a further piston connected to the said piston by a trolley which slides within the drive line.

7. A vehicular linear propulsion system according to claim 1, comprising the vehicle drivingly coupled to the piston and adapted for linear motion along the track.

8. A vehicular linear propulsion system according to claim 7, in which the vehicle is wheeled.

9. A vehicular linear propulsion system according to claim 8, in which the wheels have road-engaging tyres.

10. A vehicular linear propulsion system according to claim 8, in which the track is positioned above the vehicle which is suspended from it by means of track-engaging wheels.

11. A vehicular linear propulsion system according to claim 10, comprising a track in the form of a road surface.

12. A vehicular linear propulsion system according to claim 1, comprising electric supply rails in the drive line for supplying auxiliary power to the vehicle in use.

13. A vehicular linear propulsion system according to claim 12, in which the drive line comprises a mechanical friction braking system for braking the vehicle in use.

14. A vehicular linear propulsion system according to claim 12, comprising a mechanical friction braking system between the drive means and the inner wall of the drive line for braking the vehicle in use.

15. A vehicular linear propulsion system according to claim 14, in which the piston has an emergency pressure-release diaphragm selectively allowing the passage of air from one side to the other.

16. A vehicular linear propulsion system according to claim 15, in which the main air valves are throttle valves which regulate the flow of air gradually and thereby allow vehicle speed and acceleration to be regulated.

17. A vehicular linear propulsion system according to claim 16, comprising an air pump connected to the main supply pipe.

18. A vehicular linear propulsion system according to claim 17, in which the air pump comprises a turbine.

19. A vehicular linear propulsion system according to claim 18, comprising valve control means arranged to open and close the main-, sector gate- and exhaust-air valves in one or more predetermined sequence to propel or brake the vehicle in use.

20. A vehicular linear propulsion system according to claim 19, in which the valve control means is responsive to a brake command to sequence the valves such as to reverse the direction of drive on the piston to cause regenerative braking by causing the piston either to drive air into the pressure main or to draw air from the vacuum main.

21. A vehicular linear propulsion system according to claim 20, in which the valve control means comprises an anti-collision safety interlock system for each sector which responds to the exhaust or inlet valves in the next adjacent sector being closed to maintain closed the sector gate air valve between the sectors and to operate the main air valves in the said sector to reverse the direction of drive, whereby to brake and stop the vehicle within the said sector until the exhaust valves in the next adjacent sector have reopened.

22. A vehicular linear propulsion system according to claim 21, in which the valve control means is responsive to the position of the piston along the drive line sector and to command signals indicative of the required acceleration or deceleration, speed and/or direction.

23. A vehicular linear propulsion system according to claim 22, in which the valve control means communicates with the main air valves, the sector gate air valves and the exhaust air valves by wireless means.

24. A vehicular linear propulsion system according to claim 22, in which the valve control means communicates with the main air valves, the sector gage air valves and the exhaust air valves by the electric main supply rails.

25. A vehicular linear propulsion system according to claim 22, in which the valve control means communicates with the main air valves, the sector gate air valves and the exhaust air valves by mechanical, hydraulic or pneumatic linkage.

* * * * *